United States Patent [19]

Seufert et al.

[11] 4,215,942
[45] Aug. 5, 1980

[54] KNEADING DISC FOR A SCREW EXTRUDER

[75] Inventors: Wilhelm Seufert, Korntal; Gerhard Gnädig, Ditzingen; Fritz Przybylla, Heilbronn; Wolfgang Christen, Hemmingen; Albert Grimminger, Leonberg, all of Fed. Rep. of Germany

[73] Assignee: Werner & Pfleiderer, Stuttgart, Fed. Rep. of Germany

[21] Appl. No.: 952,048

[22] Filed: Oct. 17, 1978

[30] Foreign Application Priority Data

Nov. 12, 1977 [DE] Fed. Rep. of Germany ....... 2750767

[51] Int. Cl.$^3$ .............................................. B29B 1/06
[52] U.S. Cl. ..................................... 366/343; 366/81
[58] Field of Search ................... 366/79, 81, 83, 84, 366/85, 90, 318, 319, 322, 324, 80, 343

[56] References Cited

U.S. PATENT DOCUMENTS

| 2,781,563 | 2/1957 | Horth | 366/27 |
| 2,838,794 | 6/1958 | Munger | 366/79 |
| 3,195,868 | 7/1965 | Loomans | 366/85 |
| 3,375,549 | 4/1968 | Geyer | 366/83 |
| 3,469,824 | 9/1969 | Futty | 366/64 |
| 3,671,141 | 6/1972 | Kovacs | 366/319 |
| 3,804,382 | 4/1974 | Pultz | 366/83 |
| 4,036,540 | 7/1977 | Seufert | 366/83 |
| 4,103,353 | 7/1978 | Dougherty | 366/319 |

Primary Examiner—Robert W. Jenkins
Attorney, Agent, or Firm—Browdy and Neimark

[57] ABSTRACT

In order to improve the wear-resistance of highly stressed surfaces of a kneading disc in a helical extruding machine, the exposed tips of the kneading disc are provided with inserts of an extremely wear-resistant, hard material. In a variety of embodiments, the tips of the lenticular kneading disc are provided with bores and recesses for receiving the hard inserts. Advantageously, the recesses are cylindrical wells in which cylindrical inserts are soldered or cemented. The inserts may be made from hard metals or ceramics, for example tool steel or tungsten carbide or the like.

8 Claims, 11 Drawing Figures

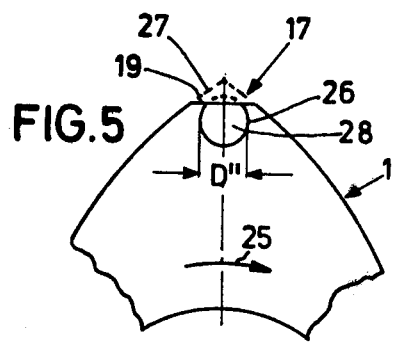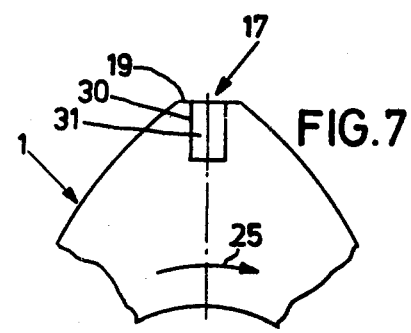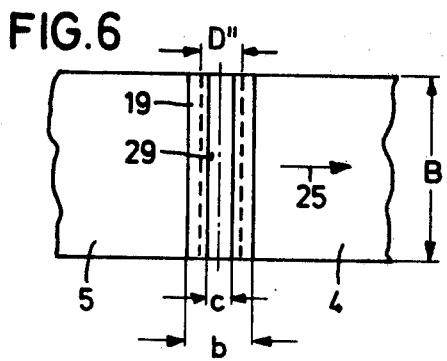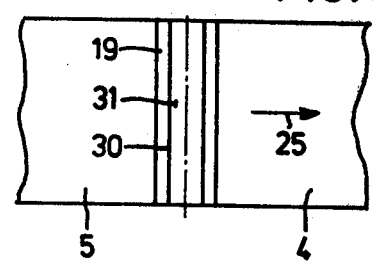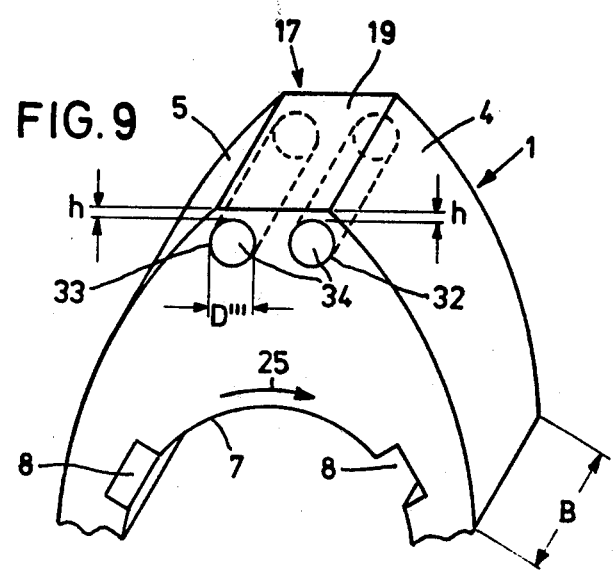

KNEADING DISC FOR A SCREW EXTRUDER

FIELD OF THE INVENTION

The invention relates to a screw extruder machine, and more particularly to the kneading discs in a screw extruder machine. More specifically, the invention relates to the provision of wear protection for those parts of the kneading disc particularly susceptible to wear and tear due to high stresses and high abrasive influences.

BACKGROUND OF THE INVENTION

Screw extruders employing kneading discs of the type to which this invention relates are known. Such kneading discs may be employed in single-shaft or multi-shaft screw extruders wherever a particularly thorough kneading action and shearing of the material to be transported is required. The dimensions of the kneading discs generally conform to similar dimensions in the associated helical screw. For example, in a twin screw extruder, the kneading disc may be of lenticular cross section while it might have a substantially triangular cross section in a triple screw extruder. The peripheral contours of the kneading disc are generally circular sections.

Kneading discs are employed in extruders in locations in which the material to be transported is exposed to the highest shear forces which reach their peak value at the points of the kneading discs which lie at the greatest radial distance from its central axis. These regions of the discs are thus subject to a particularly high degree of wear and tear. The extreme regions may have various shapes and generally have some finite area but are often referred to as kneading edges. The overall resistance of the kneading disc to wear and tear may normally be increased by hardening, either through a nitriding process or by case hardening or by a hardening throughout of the entire component. It is also known in the art to apply to the kneading edges a wear resistant material, for example by welding. These known procedures have a number of disadvantages. When hardenable steels are used as the basic material for the kneading discs, for example steel such as tool steels or high speed steels, welded joints are virtually impossible to produce. Furthermore, any welding process involves a heating of adjacent areas to an extent that they lose the hardening acquired and thus lose their resistance to wear and tear. Furthermore, the fabrication and machining of hardened workpieces is extremely difficult and expensive. In nitrided or case-hardened, i.e., surface hardened kneading discs, any subsequent welding process also diminishes the degree of hardening in the region of heating and thus tends to destroy the resistance to wear and tear in that region. If, on the other hand, the wear-resistant material is welded onto the kneading body prior to hardening, the diffusion processes taking place during the surface hardening are very uneven and non-uniform. Furthermore, when the kneading disc is hardened by quenching for example, the welded-on wear resistant materials may pop off due to the bursting of the welded seams.

The aforementioned disadvantages are inherent, for example, in a known extruder machine such as described by U.S. Pat. No. 3,375,549 in which a wear-resistant material is welded to the flights of the helix in an extruder machine.

From the German Auslegeschrift, No. 23 35 588, it is known to produce compound castings with an armor plating of particles of a very hard material in the zones which are to made wear-resistant. The manner of production in that method is to embed the particles of the hard and wear-resistant material in the required areas prior to casting. Accordingly, the individual particles of hard material must be located and held in the mold in a proper orderly distribution which is quite difficult to achieve.

The German Auslegeschrift No. 17 59 599 proposes to protect the tips of mixing blades in, for example, rotary mixing troughs with a plate of a hard metal, somewhat in the manner as is customary for metal cutting machinery, for example lathes, milling machines and the like.

A proposal to protect the interior surfaces of the housing containing the helical screws of screw extruders by means of wear-resistant inserts is described in U.S. Pat. No. 4,036,540.

SUMMARY

It is a principal object of the present invention to provide a kneading disc for a screw extruder which overcomes the aforementioned disadvantages inherent in the art and which provides a kneading disc which is resistant to wear and tear and is capable of relatively simple and inexpensive production. It is a further object of the invention to provide a wear-resistant surface at highly stressed parts of the kneading disc without any risk of break-out or bursting and without thereby imparting a detrimental effect on the remaining parts of the kneading disc.

These objects are attained according to the invention by providing inserts of wear-resistant material within the body of the kneading disc in such a way that the parent material substantially surrounds the insert. In practical use, the inserts may be pre-manufactured members which are placed in corresponding recesses within the kneading disc. Advantageously, at least part of the insert is exposed in the stressed outer surface of the kneading disc. It has been found that even if only part of the highly stressed region of the so-called edge of the kneading disc consists of the highly wear-resistant material, that material tends to reduce the wear and tear in the surrounding area so that an overall drastic reduction of wear actually occurs. It is also advantageous to dispose the insert in such a way that its effective surface is located at a small distance below the outer surface of the kneading disc. In such a case, the normal and unavoidable wear ultimately exposes the surface of the insert which then constitutes a limitation for further material removal. This construction is particularly favorable if the surface of the kneading disc is hardened. In that case, the hardening takes place prior to the positioning of the insert so that the interior surface of the recess containing the insert will also be hardened. In a particularly favorable embodiment of the invention, the normal inserts are geometrical objects with straight parallel exterior surfaces which are located in a suitably shaped recess. It has been shown to be particularly effective and simple if the insert or inserts are cylindrical and are located in a corresponding cylindrical bore within the outer regions of the kneading disc. However, the shape of the insert can also be that of a parallelepiped which is in a suitably formed groove in the kneading disc.

The insert or inserts may be fastened within the recesses of the kneading disc by soldering or with the aid of a thermally resistant cement or adhesive. This manner of attachment tends to fill voids and makes it possible for the dimensions of the insert to be somewhat smaller than the inserts of the recess, thereby avoiding the requirements for tight tolerances.

Various embodiments of the invention will now be described by way of example with reference to the drawing.

BRIEF DESCRIPTION OF THE DRAWING

FIG. 5 is a partial side view of a third embodiment of the invention;

FIG. 6 is a partial top view of the illustration of FIG. 5;

FIG. 7 is a partial side view of a fourth embodiment of the invention;

FIG. 8 is a partial top view of the embodiment of FIG. 7;

FIG. 9 is a perspective partial view of the kneading disc in a fifth embodiment of the invention;

DETAILED DESCRIPTION OF THE EMBODIMENTS

Figure 1:
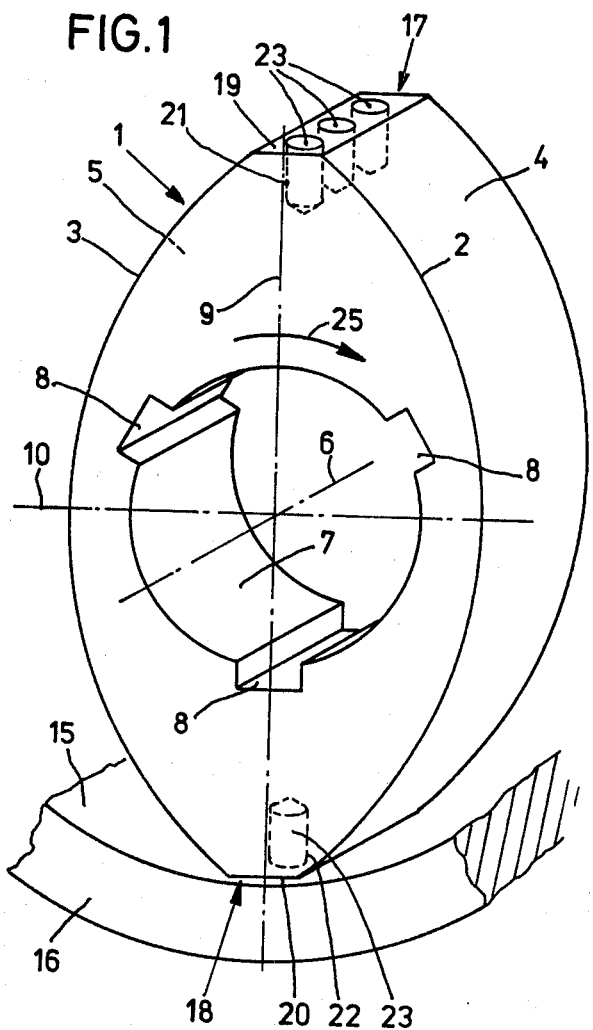
FIG. 1 is a perspective view of a kneading disc according to the invention.

FIG. 1 shows a typical kneading disc of a twin-screw extruder in a perspective view illustrating its lenticular cross section substantially defined by two circular segments 2,3. The external surfaces 4,5 of the disc are parallel to its central axis 6. Coaxially with the central axis 6, there is formed within the kneading disc a bore 7 having several keyways 8 for the purpose of placing the disc 1 onto the shaft of a helical extruder so as to impart co-rotation thereto. Kneading discs of the type illustrated are normally disposed between sections of the conveyor helix. The extent of their large diameter, i.e., the axis 9 shown vertically in FIG. 9, is substantially equal to the overall diameter of the associated screw or helix. The length of the shorter axis 10, shown horizontally in FIG. 1, corresponds substantially to the diameter of the core of the conveyor screw.

In the general area of intersection of the circular surfaces 4 and 5, there are formed areas 17 and 18, respectively, which are at the greatest radial extent from the central axis 6 and which thus will be closest to the interior wall 15 of the extruder housing 16. In the vicinity of these so-called kneader edges 17, 18, the force exerted onto the material to be treated by the screw conveyor will be the greatest as will be the wear and tear on the surface of the kneading disc 1. Advantageously, there are formed in that area flat surfaces 19, 20, respectively, which are parallel to the central axis 6 as well as to the short axis 10, i.e., substantially parallel also to the interior wall 15 of the housing 16.

Figure 2:
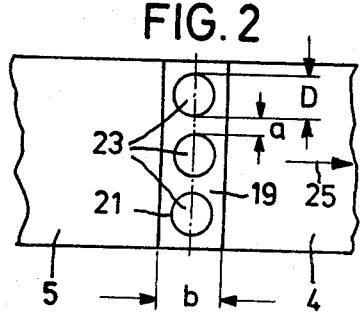
FIG. 2 is a partial top view of the kneading disc illustrated in FIG. 1.

In a first exemplary embodiment of the invention as illustrated in FIGS. 1 and 2, the wear-resistance is imparted to the kneading disc 1 by the placement of substantially radial bores 21, 22 which have blind bottoms and which are open at the corresponding flat surface 19 or 20. As may be seen from FIGS. 1 and 2, the diameter D of these bores 21 and 22 are somewhat smaller than the width b of the flat surfaces 19, 20. The distance between the extent of adjacent bores is labeled a in FIG. 2 and this distance will be seen to be definitely smaller than the bore diameter D but in all cases greater than O. Bores 21, 22 serve to receive inserts which, in this embodiment, are cylindrical inserts 23.

Figure 3:
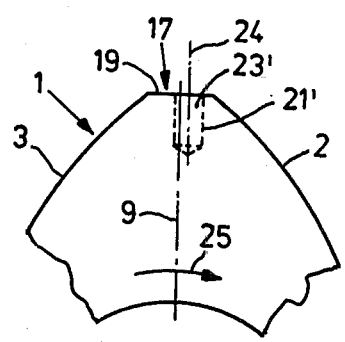
FIG. 3 is a side view of a second embodiment of a kneading disc with inserts according to the invention.
Figure 4:
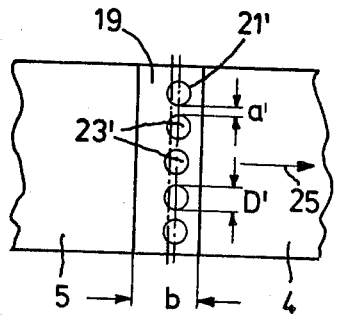
FIG. 4 is a partial top view of the embodiment of FIG. 3.

In the second exemplary embodiment of the invention according to FIGS. 3 and 4, there is provided a larger number of bores 21' and the centers, i.e., the axes 24 of these bores 21' are seen to be displaced from the central axis 9 so as to be located ahead of that axis as seen in the direction of rotation. Inasmuch as the number of cylindrical inserts 23' is somewhat greater than in the embodiment of FIGS. 1 and 2, the dimensions D' and a' are somewhat smaller than those shown in FIGS. 1 and 2.

It should be noted that the construction of the inserts and recesses is intended to be symmetrical with respect to the axes 9 and 10 so that the following description will be made only of one end of the kneading disc, it being understood that the other end is intended to be of identical construction.

In a further embodiment of the invention illustrated in FIGS. 5 and 6, a cylindrical bore 26 is formed in the tip of the kneading disc prior to the machining of the flat surface 19, i.e., when the wedge or roof-shaped portion 27, shown dashed in FIG. 5, is still in place. Bore 26 is parallel to the central axis 6 and its major volume is intended to lie in the part of the kneading disc which will remain after removal of the roof-shaped portion 27. Prior thereto, a cylindrical insert 28 is inserted into the bore 26 extending over the full width B. When the roof-shaped portion 27 is ground off to form the flat surface 19, the portion of the material of the cylindrical insert 28 contained therein is also removed so that it will then have the shape of a cylindrical segment and a part of it will be exposed in a slot of width c which is seen to be smaller than the diameter D". Furthermore, the width c of the exposed surface 29 is smaller than the width b of the surface 19.

In the embodiment according to FIGS. 7 and 8, the tip of the kneading disc is provided with a substantially rectangular groove for receiving a suitably shaped insert 31.

In a further embodiment according to FIG. 9, there are formed in the end of the kneading disc two full-width bores 32, 33 at some distance h below the surface of the area 19. Bores 32,33 serve to receive suitably shaped cylindrical inserts 34. The distance h is intended to be small compared with the diameter D''' of the bores 32, 33.

Figure 10:
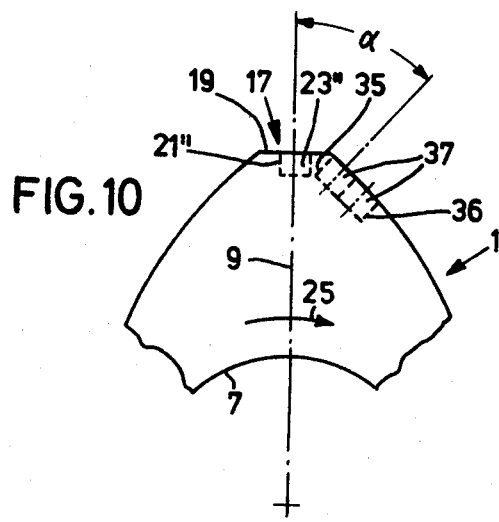
FIG. 10 is a partial side view illustrating a supplemental wear-resistant insert.
Figure 11:
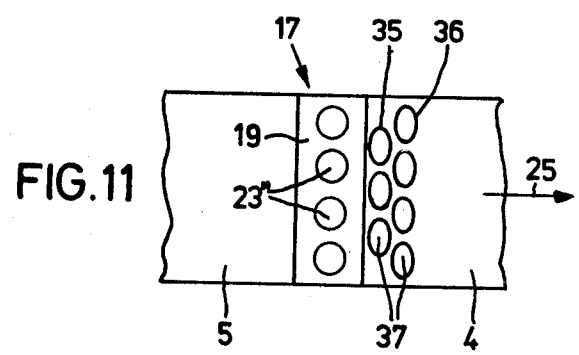
FIG. 11 is a partial top view of the illustration of FIG. 10.

In the embodiment illustrated in FIGS. 10 and 11, which is similar to that of FIGS. 1 and 2 and of FIGS. 3 and 4, there are placed in the region of the tip 17 cylindrical bores 21" which are symmetrical with respect to the long axis 9. The bores 21" serve to receive corresponding cylindrical inserts 23". However, in addition thereto and in the direction of rotation illustrated by the arrow 25, i.e. in the region lying ahead of the tip of the disc, there are formed further cylindrical bores 35, 36 whose axis is substantially normal to the adjacent surface 4. The additional bores 35 and 36 are disposed in rows which are shifted with respect to the central recesses 21' as to permit their being as close as possible to the latter. In the same manner, the row of bores 36 is shifted with respect to the bores 35 to permit their being close together. The central axes of the bores 21" and 35 are not parallel but are disposed at an angle α as seen in FIG. 10, which is less than 90°. Each of the bores 35 and 36 receives cylindrical inserts 37. Their disposition imparts to the area of the tip 17 which encounters the material to be transported earlier an increased resistance of the same strength as is given to the edge of the kneading disc.

The material of which the cylindrical inserts 23, 23', 23", 28 and 34 or the rectangular insert 31 are made is a suitable and extremely wear-resistant material such as hard metal, hard castings or tool steels. However, the material may also be ceramic, for example ceramic cutting tools. A particularly suitable material is tungsten carbide or boron carbide.

The inserts are placed in their respective bores 21, 22, 21', 21", 26, 32, 33 or the recess 30 by soldering or with the aid of a thermally resistant cement. This manner of fastening makes is possible for the outer dimensions of the inserts to be approximately the same as those of the bores or recesses. The inserts may be placed in the kneading disc 1 prior to its being hardened by case hardening or nitriding but may also be inserted thereafter. In the embodiment according to FIG. 9, it is especially recommendable to perform the hardening of the kneading disc prior to the insertion of the cylindrical inserts 34 so that the interior surfaces of the bores 32, 33 will also be hardened. After the insertion of the wear-resistant inserts, the hardened kneading disc may be ground to its exact final dimensions.

Kneading discs having the shape of those described in the aforementioned examples are illustrated for example in the German Patent No. 813 154. Kneading discs having three edges, and in which the methods and procedures according to the present invention may be equally well applied are illustrated in the German Patent No. 940 109 (corresponding to U.S. Pat. No. 2,814,472) and also in U.S. Pat. No. 3,122,356 which also illustrates the location of the kneading discs between two adjacent helical sections.

In the majority of cases, the kneading discs are used in multiple screw extruders having at least two shafts in such a way that they scrape each other clean during rotation. In order to maintain the effectiveness of this scraping and also to maintain the kneading action, the wear of the kneading edges must never be large and normally should not exceed at most a few millimeters. Accordingly, the length of the inserts is determined almost exclusively by the necessity for secure anchoring within the body of the kneading disc and not by the expected amount of wear.

It will be understood that the methods and inserts described in the FIGS. 1–4 and in FIGS. 10 and 11 can also be used to strengthen the outer surfaces or sides of the blades of helical kneading machines.

It will be understood by those in the art that various changes may be made in the manner of embodying the invention without thereby departing from its spirit and scope.

What is claimed is:

1. A kneading disc for a screw-type extruding machine, the disc having a central longitudinal axis and comprising a kneading body of given width, given material and having a region of maximum operating stress, and at least one wear-resistant insert placed fixedly in a form-fitting recess in said body of the disc in said region of maximum operating stress so as to be substantially surrounded by said given material of said kneading body, wherein the geometrical shape of said at least one insert has straight and mutually parallel outer surfaces and is placed in a correspondingly configured recess in said body of the kneading disc, said configured recess constituting said form-fitting recess, and wherein said at least one recess extends parallel to said central longitudinal axis and completely across said given width of said kneading body.

2. A kneading disc according to claim 1, wherein at least a part of said insert is exposed in the surface area of the kneading body.

3. A kneading disc according to claim 1, wherein the maximum radial extent of said at least one insert lies a finite distance below the operational surface of said kneading body.

4. A kneading disc according to claim 1, wherein said at least one insert is cylindrical and is located in a correspondingly configured cylindrical bore within said kneading body.

5. A kneading disc according to claim 1, wherein said insert has the shape of a parallelepiped and is located in a correspondingly configured groove within the kneading body.

6. A kneading disc according to claim 1, wherein said at least one insert is affixed by soldering in a corresponding recess in said kneading body.

7. A kneading disc according to claim 1, wherein said at least one insert is affixed with thermally resistant cement within a corresponding recess in said kneading body.

8. A kneading disc according to claim 1, wherein said at least one insert is placed in the vicinity of a kneading edge of said body.

* * * * *